Figure 12:
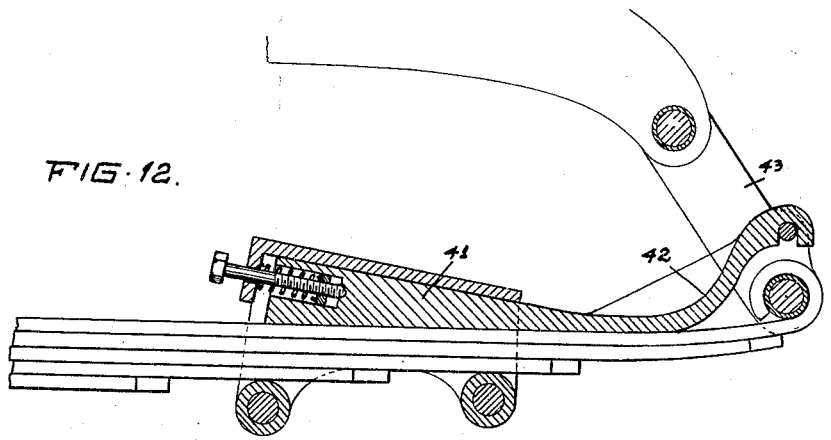

May 31, 1932.    G. W. CRABTREE    1,860,656
LAMINATED VEHICLE SPRING
Filed Jan. 9, 1928    4 Sheets-Sheet 1
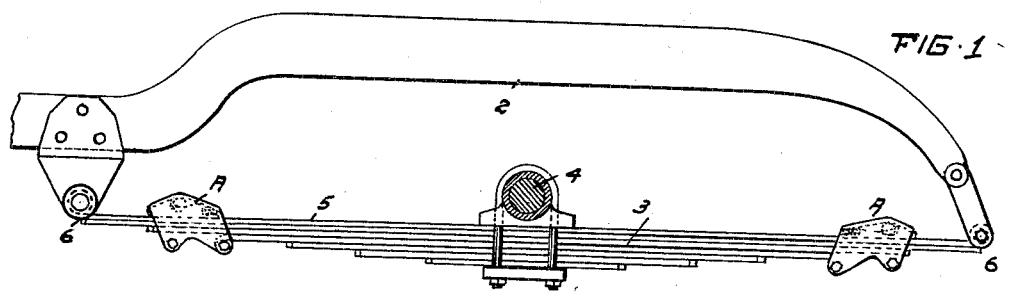
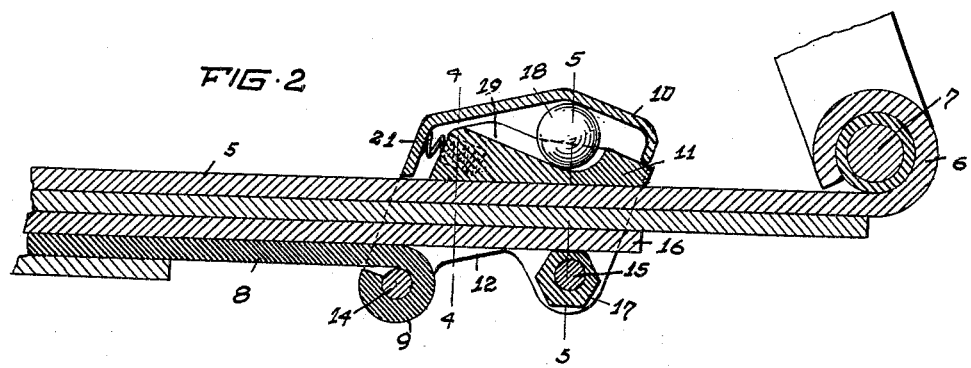
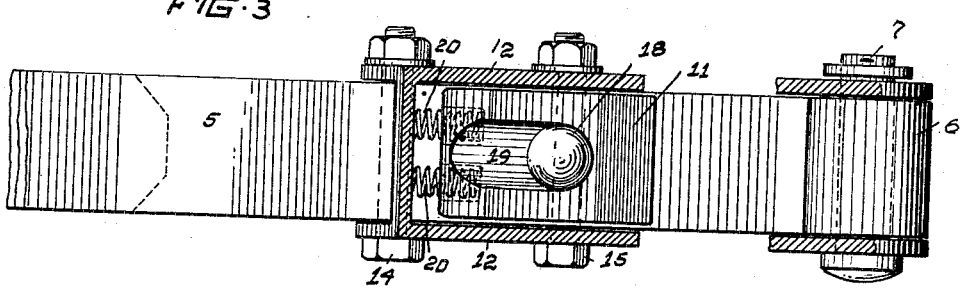
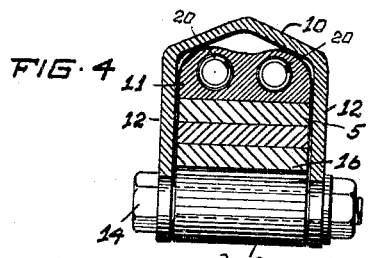 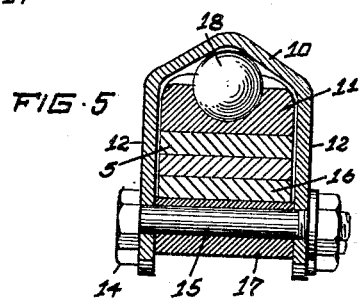 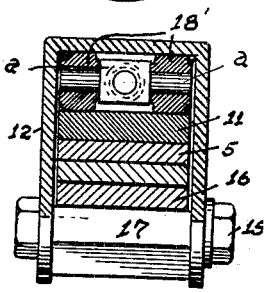
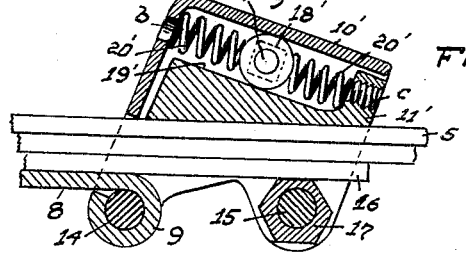
Inventor
GEORGE W. CRABTREE
By
Fisher, Moser & Moore
Attorney May 31, 1932.     G. W. CRABTREE     1,860,656
LAMINATED VEHICLE SPRING
Filed Jan. 9, 1928     4 Sheets-Sheet 2
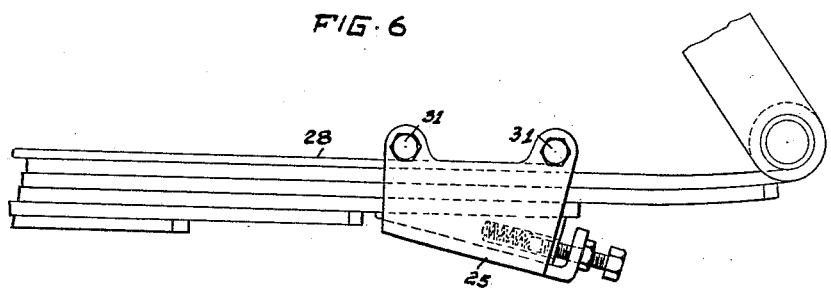
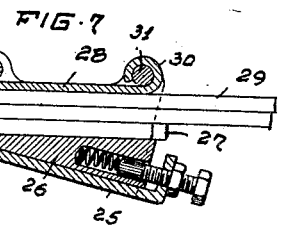 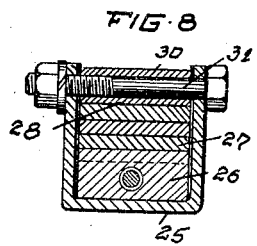
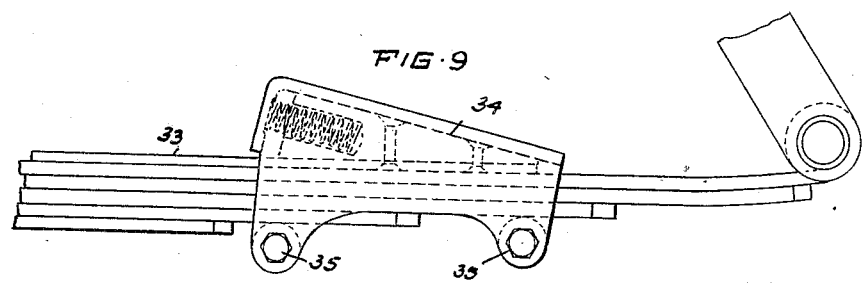
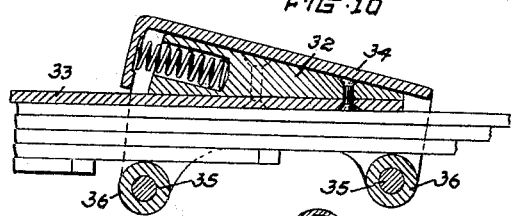 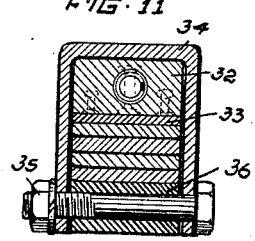
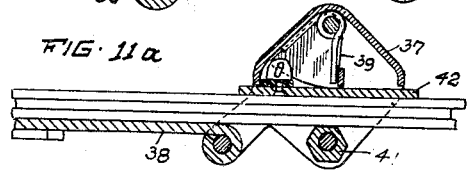
Inventor
GEORGE W. CRABTREE
BY:
Fisher, Moser & Moore Attorney May 31, 1932. G. W. CRABTREE 1,860,656
LAMINATED VEHICLE SPRING
Filed Jan. 9, 1928 4 Sheets-Sheet 3

Inventor
GEORGE W. CRABTREE
By Fisher, Moser & Moore
Attorney

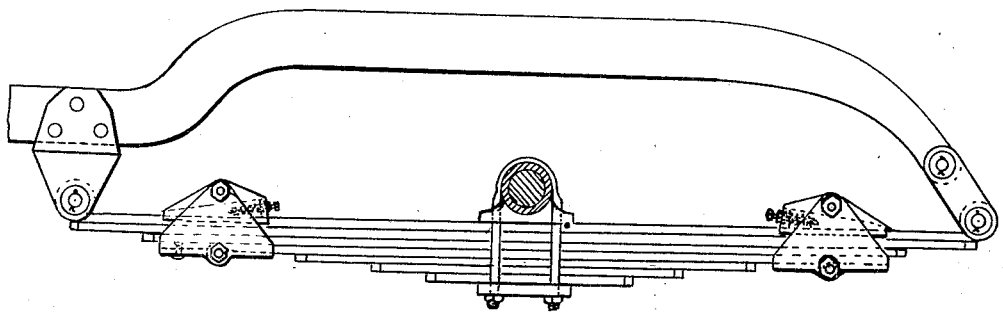
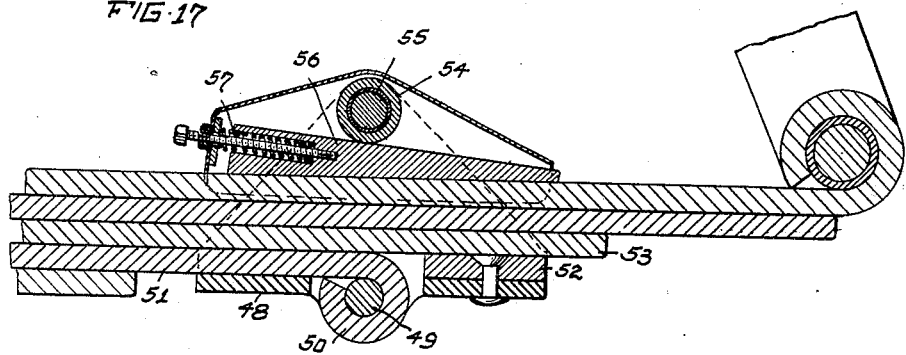
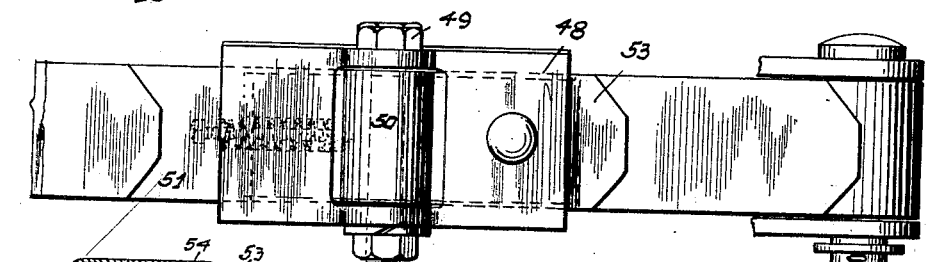
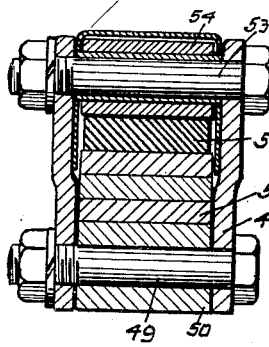
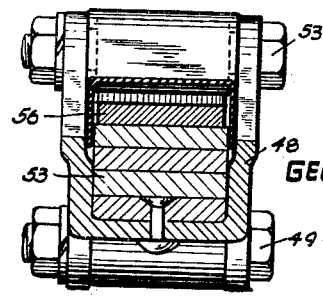

Patented May 31, 1932

1,860,656

UNITED STATES PATENT OFFICE

GEORGE W. CRABTREE, OF CLEVELAND, OHIO

LAMINATED VEHICLE SPRING

Application filed January 9, 1923. Serial No. 245,384.

My invention relates to vehicle springs and spring controlling devices, and the invention is especially applicable to and of particular value and utility in connection with laminated springs and a vehicle wherein sudden rebound of the vehicle body is very objectionable. Thus the object of the present invention in general is to check sudden rebound of the vehicle body by clamping the leaves of the springs frictionally together during a flexing movement of the springs in one direction, and to permit the spring leaves to play freely when flexed in the opposite direction. Thus the spring controller clamps the leaves frictionally together when the body springs upwardly or rebounds as when the vehicle body wheels meet an obstruction or drop into a deep rut, but when the load compresses the spring the controlling device acts automatically to release the clamping pressure and restore normal conditions and free play between the spring leaves. The spring-controller may also be termed a self-acting rebound check and shock absorber, but it differs from the general run of devices so designated in that it is activated by a differential creeping movement between the leaves of the spring when flexed.

In the accompanying drawings, the figures on Sheet 1 show my preferred embodiment of the invention, Fig. 1 being a side elevation of a part of a chassis frame showing a laminated spring shackled thereto and equipped with a spring controller constructed according to my invention. Fig. 2 is a sectional view, enlarged, of one end of the spring and a controller thereon. Fig. 3 is a top view of the spring shown in Fig. 2, and a sectional view of the shell or casing of the controller. Figs. 4 and 5 are cross sectional views of the springs and controlling devices on lines 4—4 and 5—5 respectively of Fig. 2. Fig. 5a is a sectional view of a modified form of controller, and Fig. 5b is a vertical section transversely of the same device.

Fig. 6, Sheet 2, is a side view of another modification, and Figs. 7 and 8 sectional views of the same. Figs. 9, 10 and 11 are side and sectional views of a further modification, and Fig. 11a a sectional view of still another form.

Figure 13:
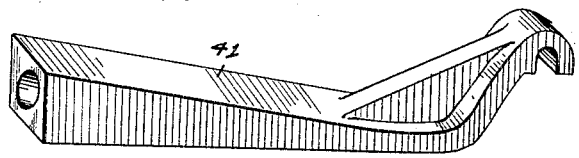
Figure 14:
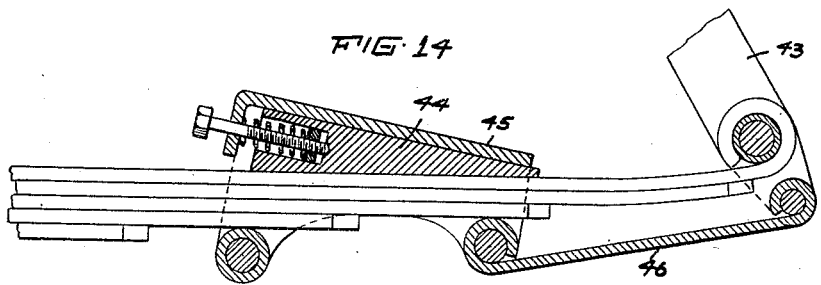
Figure 15:
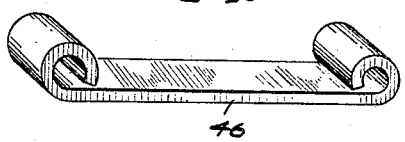

Fig. 12, Sheet 3, is a sectional view of a modified clamping device which is connected to both the shackle and a spring, and Fig. 13 is a perspective view of the wedge member shown in section in Fig. 12. Fig. 14 is a sectional view of an assembly embodying a link connection for the clamping device, and Fig. 15 is a perspective view of the connecting link. Figs. 16 to 20, Sheet 4, are side and bottom elevations and sectional views representing another modified form of the invention in which a roller and wedge is used in lieu of a ball and wedge.

On Sheet 1 of the drawings, Figs. 1 to 5, I show a portion of a chassis frame 2, and a laminated spring 3 shackled at its opposite ends to said frame and affixed at its middle to an axle 4 according to common practice. However, it should be understood that the invention may be applied to other forms of laminated springs than the kind shown, and that the present showing is only one exemplification of its adaptability and use. But as delineated the spring consists of a plurality of leaves of graduated length, the longest leaf 5 having curled ends or eyes 6—6 at its opposite ends to receive the shackle bolts 7. One of the shorter leaves, the fourth leaf 8 for example, or a supplemental leaf, is also formed with curled extremities or eyes 9 to permit a pair of friction controlling devices A—A to be connected thereto and thence therethrough to axle 4. A description of one controller or clamping device will suffice for the other, and in one embodiment of the invention the clamping assembly consists of a saddle 10 in the form of a pressed steel shell or casing of yoke-shape within which a wedge member 11 is confined in a friction-engaging position upon the outer or longer spring leaf 5. The side walls 12 of saddle 10 extend downwardly in loose but close fitting relation to the edges of the spring leaves and a bolt 14 connects one end of the saddle to the end eye 9 of the short leaf 8. The opposite end of the saddle is provided with a second bolt 15 passing underneath the free end of the third leaf 16 of the spring, and an eccentric sleeve 17 is sleeved rotatably on this bolt, which sleeve may be hexagonal in cross section or have a series of flat faces at varying distances from the axis of the bolt to bear or seat against the bottom face of leaf 16 and to provide for adjustment in making connections with spring leaves of different thicknesses and to take-up wear after prolonged use. The top of saddle 10 is of angular formation to provide a straight race or seat centrally thereof for a steel ball 18, and a corresponding seating channel 19 for the ball is provided in the top of wedge member 11, the co-acting seats or channels being parallelly inclined in respect to the flat bottom of the wedge member and the upper spring leaf 5. A pair of coiled compression springs 20 are confined within sockets in one end of wedge member 11, and these springs bear against one end wall 21 of the saddle, thereby maintaining a constant operative connection between the saddle and the spring by and through the movable ball and the wedge member. The ball is centrally situated to obtain a uniform clamping action, and the differential longitudinal movement which takes place between the leaves when the spring is flexed in one direction acts to clamp the leaves together upon rebound of the vehicle body, whereas flexure of the springs in the opposite direction or under load releases the wedge member, and permits the leaves to slide upon each other as normally. Accordingly, when the spring is compressed all the leaves thereof yield freely to resiliently support the load, but when the reflex action takes place the friction clamping devices act immediately to compress the longer leaves together, thereby retarding and checking their action and preventing sudden rebound of the car body. A lesser or greater number of spring leaves may be clamped and controlled in the way stated, dependent upon the load and the kind of laminated spring involved, and the frictional clamping devices may be variously constructed to achieve the desired object with varying results.

Thus, in Figs. 6 to 8, Sheet 2, of the drawings, I show a modified structure embodying the invention, comprising an inverted saddle 25 containing a spring-pressed wedge member 26 engaging the third leaf 27 of a laminated spring, a short supplemental leaf 28 being mounted upon the top and longer spring 29 and connected at its eye end 30 with a bolt 31 which is attached to one end of the saddle.

In Figs. 10 and 11, I show a wedge member 32 riveted to one end of a supplemental short leaf 33 and confined within a wedge-shaped saddle 34 having a pair of cross bolts 35 and rollers 36 in engagement with a pair of the shorter leaves of the spring.

In Fig. 11a a saddle 37 is connected to the eye end of a short leaf 38, and a spring-pressed cam or rocker 39 is loosely connected to a presser or friction plate 40 opposite an adjustable rest or clamping member 41.

Referring to Sheet 3 of the drawings, Figs. 12 and 13 illustrate another modification of the invention using a spring-pressed wedge member 41 having an extension 42 which is hooked to the swinging link or shackle member 43 for the spring. Figs. 14 and 15, disclose a still different hook up in which a spring-pressed wedge member 44 is confined within a saddle 45 having a link connection 46 with the shackle member 47 for the spring.

In Sheet 4 of the drawings, I show a modified form of the invention, comprising a saddle 48 which is pivotally connected by a bolt 49 to the eye 50 of a short leaf 51 of the vehicle spring. A bearing plate 52 is riveted to the saddle to bear against a superposed leaf 53. A roller 54 is carried by a bolt 55 secured to the side walls of the saddle, and this roller rests upon a tapered wedge member 56 which is engaged at one end by a coiled spring 57. A separate cover encloses and protects the working parts of this device.

In Figs. 5a and 5b I show a saddle or yoke member 10' pivotally connected with a supplemental or short spring leaf 8, and a tapered wedge 11' is seated upon the upper spring leaf 5 between the side walls of the saddle or yoke member. In lieu of using a ball I employ herein a pair of rollers 18' between the parallelly inclined surfaces 10' and 19', and mount the rollers on a common shaft or axle a which is interposed between a pair of compression springs 20'—20', one of which bears against the perforated cross wall b of the saddle and the other against the perforated flange c of the wedge, thereby holding the wedge in engagement with the rollers and against the spring leaf 5 opposite the clamping member 17. Flexing of the spring upwardly at its middle and downwardly at its ends causes a creeping movement relatively between the spring leaves which tends to overcome the pressure of the compression springs 20' and permit the wedge to slide freely over the top leaf 5, but when a reverse or reflex movement takes place suddenly the relative creeping movement between the spring leaves is also reversed thereby producing an immediate binding action of the wedge and tight clamping of the several leaves between the wedge and clamping member 17. When the controlling device is secured to the vehicle spring, the wedge is movably confined within the saddle by said spring, but in assemblying operations it is found desirable to fasten the wedge temporarily to the saddle by means of a screw or bolt (not shown) which bolt may be inserted through the perforated end wall b of the saddle and screwed into the screw-threaded perforation in flange c.

What I claim, is:

1. A controlling device for a laminated vehicle spring, including a pair of cooperating wedging members for compressing a plural number of spring leaves together during the reflex action of the spring and yielding means to shift one of said wedging members longitudinally with respect to the other wedging member during compression of the spring by a load.

2. A controlling device for a laminated vehicle spring, including a pair of wedge-shaped leaf-clamping members supported by and frictionally engaged with a spring, means for activating said members by the flexing movements of said spring, and means to shift said members longitudinally with respect to each other during compression of the spring by a load.

3. A controlling device for a laminated vehicle spring mounted upon an axle, including a pair of wedging members frictionally engaged with said spring for compressing a plurality of leaves of the spring, and spring means to shift said wedge members longitudinally with respect to each other, one of said members being connected to the axle, and the other member being free to ride upon said spring and to be shifted by said spring means.

4. A controlling device for a laminated vehicle spring, including a saddle member, a wedge member and a spring member adapted to shift said members longitudinally with respect to each other, one of said members being connected to one spring leaf and the other member having frictional engagement with a second spring leaf.

5. A controlling device for a laminated vehicle spring, including a saddle coupled to one of the leaves of the spring, and a wedge member interposed between said saddle and another leaf of said spring and in frictional contact with said leaf and a yielding member between said saddle and said wedge member adapted to shift said wedge member longitudinally with respect to said saddle.

6. A controlling device for a laminated vehicle spring, including a saddle enclosing a plurality of leaves of different length in said spring, and a wedge member interposed between said saddle and one of the leaves of said spring and in frictional contact therewith and means to shift said saddle and said member longitudinally with respect to each other, one of said parts being connected to one of the shorter leaves of the spring.

7. A controlling device for a laminated vehicle spring, including a saddle, a wedge member in frictional contact with a spring, a rolling element interposed between said saddle and wedge member, and means to shift said saddle and wedge member longitudinally with respect to each other, one of said parts being connected to one of the leaves of the spring.

8. A controlling device for a laminated vehicle spring, including a saddle having an inclined surface, a wedge member engaging one of the spring leaves having an inclined surface, a rotatable element interposed between said surfaces, and means for producing a shifting movement relatively between said saddle and wedge member by a creeping movement between the different leaves of the springs.

9. A controlling device for a laminated vehicle spring, including a saddle enclosing the free ends of a plural number of leaves of different length in the spring, said saddle being connected to one of the shorter spring leaves, and a wedge member and rolling element associated with said saddle adapted to compress the spring leaves together in a reflex movement of the spring.

10. A controlling device for a laminated vehicle spring, a saddle embracing the leaves of the spring, and connected with one of the leaves, a wedge interposed between said saddle and another leaf of said spring and frictionally engaged with such leaf, means to shift said saddle and member longitudinally with respect to each other and an adjustable member for taking up wear in said parts.

11. A controlling device for a laminated vehicle spring, including a saddle and a wedge member frictionally engaged with a spring for compressing a plural number of spring leaves together, and means for anchoring one of said parts so that a wedge action is effected by a differential movement between the leaves when a reflex action takes place in the loaded spring, said means including yielding means adapted to force said wedge member longitudinally into operating connection with said saddle.

12. A controlling device for a laminated vehicle spring, including a saddle and a wedge member, one of said parts being connected to a leaf of the spring, rolling elements interposed between said saddle and wedge member, and compression springs extending in opposite directions from said rolling elements into engagement with said saddle and wedge member.

In testimony whereof I affix my signature.

GEORGE W. CRABTREE.